United States Patent
Van Den Aker (10) Patent No.: US 10,563,639 B2
(45) Date of Patent: Feb. 18, 2020

(54) HEAT SENSITIVE ACTUATOR DEVICE

(71) Applicant: KONINKLIJKE PHILIPS N.V., Eindhoven (NL)

(72) Inventor: Karel Johannes Adrianus Van Den Aker, Liempde (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/509,289

(22) PCT Filed: Sep. 8, 2015

(86) PCT No.: PCT/EP2015/070420
§ 371 (c)(1),
(2) Date: Mar. 7, 2017

(87) PCT Pub. No.: WO2016/041807
PCT Pub. Date: Mar. 24, 2016

(65) Prior Publication Data
US 2017/0276122 A1   Sep. 28, 2017

(30) Foreign Application Priority Data
Sep. 15, 2014   (EP) .................................. 14184747

(51) Int. Cl.
*F03G 7/06*   (2006.01)
(52) U.S. Cl.
CPC .................... *F03G 7/065* (2013.01)
(58) Field of Classification Search
CPC ........................................ F03G 7/065

USPC ...................... 60/527–529; 310/307
See application file for complete search history.

(56) References Cited

U.S. PATENT DOCUMENTS

| 3,678,685 | A | * | 7/1972 | Low | F03G 6/00 60/529 |
|---|---|---|---|---|---|
| 5,588,295 | A | | 12/1996 | Brotz | |
| 5,619,177 | A | * | 4/1997 | Johnson | H01H 59/0009 251/129.01 |
| 6,764,166 | B2 | | 7/2004 | Silverbrook | |
| 7,104,056 | B2 | | 9/2006 | Taya et al. | |
| 2003/0117459 | A1 | | 6/2003 | Silverbrook | |
| 2006/0038643 | A1 | | 2/2006 | Xu et al. | |
| 2010/0164330 | A1 | | 7/2010 | Komatsu et al. | |
| 2010/0247271 | A1 | | 9/2010 | Sundholm | |
| 2012/0174571 | A1 | * | 7/2012 | Villanueva | F03G 7/065 60/527 |
| 2013/0081389 | A1 | * | 4/2013 | Browne | H01H 37/323 60/527 |

(Continued)

FOREIGN PATENT DOCUMENTS

| DE | 10142998 A1 | 3/2003 |
|---|---|---|
| EP | 1243793 A2 | 9/2002 |

(Continued)

*Primary Examiner* — Mark A Laurenzi
*Assistant Examiner* — Mickey H France (57) ABSTRACT

A heat sensitive actuator uses a shape memory material layer which is thermally stimulated to change shape, in response to a rise in temperature, from a first shape at a first temperature to a second shape at a second temperature. A layer stack is associated with the shape memory material layer, and it can adopt the first shape at the first temperature. In this way, the layer stack is used to return the shape memory material to its original shape after cooling.

16 Claims, 3 Drawing Sheets

(56) References Cited

U.S. PATENT DOCUMENTS

2014/0009035 A1* 1/2014 Toyoda .................... H01G 5/16
310/330

FOREIGN PATENT DOCUMENTS

| JP | 0893634 A | 4/1996 |
| JP | 2002039053 A | 2/2002 |
| JP | 2002130114 A | 5/2002 |
| JP | 2010066458 A | 3/2010 |

* cited by examiner

HEAT SENSITIVE ACTUATOR DEVICE

CROSS-REFERENCE TO PRIOR APPLICATIONS

This application is the U.S. National Phase application under 35 U.S.C. § 371 of International Application Serial No. PCT/EP2015/070420, filed on Sep. 8, 2015, which claims the benefit of European Patent Application No. 14184747.5, filed on Sep. 15, 2014. These applications are hereby incorporated by reference herein.

FIELD OF THE INVENTION

This invention relates to a actuator device, for providing an actuator response which is dependent on temperature. The invention further relates to manufacturing and use of the actuator device.

BACKGROUND OF THE INVENTION

There are many applications which could benefit from a reduced size actuator, but which can induce a significant stroke and apply a significant force.

Motors are most commonly used as actuators for generating large strokes and forces. For many miniaturized applications, even small motors are too large, heavy, noisy and expensive.

Shaped memory materials (SMMs), especially shape memory alloys (SMAs), are able to provide significant force and stroke when heated beyond their specific phase change temperature. Even if the dimensions of the material are small, the force and stroke delivered are, relative to these dimensions, very high and accurate, over a very long period of time and after many switching operations.

The use of SMM to provide an actuation signal, dependent on temperature, has thus been investigated. For example, U.S. Pat. No. 6,764,166 discloses the use of a SMA forming part of an ejection nozzle for an ink jet printing device. After the temperature rise and shape change due to the phase change, the material must be brought back to the original shape, before the actuation can be restarted. In U.S. Pat. No. 6,764,166, the nozzles are pre-stressed into a curled state, and heating of the nozzle cause the nozzle plate to straighten. After cooling, the pre-stress returns the plate to the curled state.

The need for pre-stressing is a disadvantage which follows from the fact that when there is a temperature decrease, the phase changes back to the original phase, but the shape does not. Thus, before the actuator can be used again, after a temperature decrease, an external actuation must be initiated to reverse the shape change of the SMM.

SUMMARY OF THE INVENTION

The invention seeks to provide an improved actuator device wherein activation is dependent on heat or temperature sensitivity of the activation device and wherein the shape activation is reversible.

The invention is defined by the independent claims. The dependent claims provide advantageous embodiments.

According to the invention there is provided an actuator device, the use of the device and an apparatus that is partially controlled by the device and a method of actuation.

The invention combines a layer stack having at least two layers of different coefficients of thermal expansion, attached to one another for operating like a bimetallic strip upon heating, and a layer having a shape memory material, where the layer having a shape memory material may be one of the layers of the layer stack or a separate layer. The heat sensitivity of the actuator device for one part comes from the shape change response of the actuator's shape memory material(s). For the other part, the head sensitivity comes from the layer structure that functions as a bimetallic strip configuration.

Within the context of the invention, the layer stack is a structure that is able to convert a temperature change into mechanical displacement. A bimetallic strip is an example of such structure. The bimetallic strip consists of two strips of different metals which expand at different rates as they are heated. Although in practice such strips usually comprise or consist of metals such as steel and copper, or in some cases steel and brass, the layer stack of the invention is not limited to these materials, but can include also organic materials such as polymers. If the shape memory materials are organic materials (polymers), then the layer stack materials preferably also are organic materials (polymers). If the shape memory materials are metals and/or metal alloys, then the layer stack materials are preferably also metals and/or metal alloys The layers are joined together throughout or at local points along their length preferably by riveting, brazing, welding, or glueing. However, such joints may also extend over longer distances such that the strips have other layers or mechanical connections in between them. In this way, the layer stack follows the shape of the shape memory material and shape change can be returned to original with optimum effect. Such in between layers can be heat isolating layers in order to be able to heat only specific layers of the stack for example through electrically induced Joule heating. The different expansions force the flat strip to bend one way if heated, and in the opposite direction if cooled below its initial temperature. The metal with the higher coefficient of thermal expansion is on the outer side of the curve when the strip is heated and on the inner side when cooled.

Preferably the layers of the layer stack and the shape memory material layer are completely joined together throughout their length and width to give a compact and robust actuator member for the actuator device. Shape following characteristic of the layer stack therewith is the best attainable.

The force applied by the shape memory material layer when undergoing a transition, above the transition temperature to the second shape, exceeds any resisting force that is applied by the layer stack. However, when cooled back to a temperature below the transition temperature, the layer stack is able to apply a force sufficient to return the shape memory material layer to the first shape.

This configuration provides an integrated sensor and actuator, which partially or fully avoid the need for an external actuator for the reverse shape change. This opens an enormous number of applications for the use of shape change materials as small actuators with the ability to deliver work.

This arrangement of the invention also avoids large stresses in the layer stack in that the structure has low internal stresses when in the first shape.

The shape memory material layer can have one or more shape memory materials, but preferably has one shape memory material. The layer may have such materials embedded or alongside other materials. Preferably the layer consists of one or a plurality of shape memory materials. In the latter case the shape can be entirely determined by the shape memory materials. Preferably, the shape memory materials are metals or metal alloys. Preferably the layer stack materials are metals or metal alloys. Other and more specific materials will be described in the detailed description of the invention.

The first temperature preferably is below the phase change temperature of the shape memory material and the second temperature is above the phase change temperature of the shape memory material. This way full advantage can be had from the phase change of the shape memory materials.

The layer stack may comprise the shape memory material layer as one of its two layers. The coefficient of thermal expansion of the shape memory material layer is thus different than the coefficient of thermal expansion of the first layer of the layer stack. Therewith the overall actuator may have as few as two layers.

In a preferred arrangement the actuator device may comprise a shape memory material layer sandwiched between first and second layers of first and second coefficients of thermal expansion respectively. Thus, in this case the actuator has at least three layers. In an embodiment the coefficient of thermal expansion of the shape memory layer is equal to or in between the respective coefficients of thermal expansion of the first layer and the second layer.

This provides a shape memory material with metallic layers on both sides forming a sandwich structure between materials with significantly different coefficient of thermal expansion (CTE). At one side there is a material with relatively high CTE and at the other side there is a material with relatively low CTE (by "relatively" is meant relative to each other). Therewith the layers can be kept relatively thin when compared to the two layer stack actuator device when same forces are to be achieved. This is advantageous for fatigue reduction and thus lifetime (number of actuation cycles) of the actuator member in the device.

In the above examples the right combination of materials types and dimensions of the materials with high and low CTE together with a suitable shape memory material is able to provide the shape return by using the bimetallic strip configuration to reverse the shape of the shape memory material after cooling down below the phase change temperature. Thermal coefficients of materials can be conveniently taken from literature databases and used to in combination with design constraints provide the workable embodiments.

In an alternative, the shape memory material layer is a layer different from the first layer and the second layer and is directly attached to only the second layer and not directly attached to the first layer. In this embodiment there effectively is a bimetallic strip layer stack on one side of a layer of shape memory material.

There are various possible shape changes that can be used. One useful type of shape change is one based on introducing or reducing a bend in the shape memory material layer. Thus, in such alternative the first shape and/or the second shape are bent shapes in a stack direction of the layer stack and either the first shape is a less bent shape than the second shape, the first layer is at the outer side of the second shape and the first layer has a higher coefficient of thermal expansion than the second layer, or the first shape is a more bent shape than the second shape, the first layer is at the inner side of the first shape memory material layer and the first layer has a higher coefficient of thermal expansion than the second layer.

In other words the bimetallic strip configuration straightens the shape when cooled and the shape memory material introduces the bend when heated and the opposite arrangement, adopting a bent shape when cool, is also possible.

In both cases the materials have been located based on their coefficients of thermal expansion such that the bimetallic strip effect force adds to the force created by the shape memory material induced shape change upon going from first to second temperature and also provide the maximum aid for the return temp change.

In another example, the first and second shapes comprise spring shapes with different degrees of spring expansion.

An actuator device can comprise a heater device for heating at least the shape memory material layer and/or a cooling device for cooling at least the shape memory material layer. This may be needed to provide heating control when the environment of use does not provide a change of temperature. Also heating and cooling may be assisted to provide faster actuator state change. The heating may be a joule heating element or device. The cooling may be through liquid flow or other commonly known cooling devices or principles.

The actuator may be used in various applications and can be part of various apparatuses, especially when the device is used to partly control the apparatus or the application.

Thus, an apparatus may comprise a circuit including the actuator device, wherein the actuator device operates as a switch. This may be an electrical circuit and an electrical switch, but can also be a pipe circuit with valves as the switch.

The apparatus can be a safety cut-out circuit that uses an actuator of the invention, which operates an electrical cut-out switch when the shape memory material has the second shape. This can be used in a lighting unit to provide a safety cut out in the event of overheating.

The apparatus can be one which has a configuration controller that adopts different physical configurations based on the actuation device actuation states. This can be used to provide aesthetic changes in the appearance of a device in dependence on temperature. Such application/apparatus includes for example lighting devices or other decorative home or office devices.

In another aspect, a cycling circuit for cycling the operation or the configuration of a plurality of devices uses a set of actuators of the invention. This enables devices to take turns in being operated until they reach a limit temperature, or devices can take turns in adopting different physical configurations.

Thus, the apparatus can be a lighting unit comprising a plurality of lighting elements and a device cycling circuit as described above, wherein each lighting element comprises one of the plurality of devices of the device cycling circuit. This can be used to prolong the lifetime of devices, or to provide a different physical configuration of a device over time. This can also be used in a lighting unit having multiple lighting elements.

The apparatus can be part of, or can be a motor, wherein the actuator device is part of a valve for control of fluid used with the motor when in operation. The motor can be for example any one of a combustion motor (piston or turbine or jet), and an electric motor. The actuator device as part of the valve for fluid control can be for control of oil flow control for lubrication, and/or can be for fuel control, and/or can be for coolant liquid control. The fluid control can be from a reservoir to point of use within the motor with relevant points of use being for example: combustion chamber, lubrication points or areas or evaporation points.

This provides automatic oiling, fuelling or cooling of a motor, to reduce the need for operation, and/or maintenance and/or servicing.

In another aspect, the invention also provides a heat sensitive actuation method.

In the method the first temperature is preferably below the phase change temperature of the shape memory material and the second temperature is above the phase change temperature of the shape memory material.

Preferably the layer stack is kept at a temperature below the second temperature at all times. The layer stack can follow the shape change of the shape memory material layer when that layer is heated and if cooling of that layer starts full return force is exerted by the layer stack. Also, the layer stack does not need to cool so that the whole actuator may be faster.

In the method, changing the temperature of the phase change material layer, includes changing the temperature of the layer stack. The layer stack may now help providing force to the shape change step based on shape change of the shape change material layer.

BRIEF DESCRIPTION OF THE DRAWINGS

Examples of the invention will now be described in detail with reference to the accompanying schematic drawings, in which.

DETAILED DESCRIPTION OF THE EMBODIMENTS

The invention provides an actuator device that may be heat sensitive and that may have at least a first actuation step or state and a second actuation step or state. The actuator device makes use of a shape memory material (SMM) which, when thermally stimulated can change shape, in response to a rise in temperature, from a first shape at a first temperature to a second shape at a second temperature. Therewith the actuator is made to perform the first actuation step to attain the second actuation state. The actuator device makes use of a layer structure that can operate analogously as a bimetallic strip configuration; i.e. it may bend upon heating and bend back upon cooling. Thus the layer structure has at least two layers with different coefficients of thermal expansion (CTE). The layer structure may comprise the layer having the shape memory material, or may be coupled to the layer having the SMM material, such that upon cooling from the second temperature to the first temperature, the layer structure causes, through thermal contraction of the layers of the layer stack excluding any shape memory layers, the layer having the SMM to follow the shape change back (at least to partial extent) of the layer structure to the first shape. In this way, the layer structure is used to return the actuator shape memory material layer to its original shape after cooling. The actuator therewith can perform the second actuation step back to the first actuation state, and is ready to perform the first actuation step again.

Shape memory materials (SMMs) are well known, in particular shape memory alloys (SMAs). The two main types of shape memory alloys are copper-aluminium-nickel, and nickel-titanium (NiTi), which is known as Nitinol. Nitinol is for example available in the form of a wire, rod and bar, or as a thin film. SMAs can however also be created by alloying zinc, copper, gold and iron.

SMMs can exist in two different phases, with three different crystal structures (i.e. twinned martensite, detwinned martensite and austenite).

Although iron-based and copper-based SMAs, such as Fe—Mn—Si, Cu—Zn—Al and Cu—Al—Ni, are commercially available and cheaper than Nitinol, Nitinol based SMAs are more preferable for most applications due to their stability, practicability and superior thermo-mechanic performance.

Nitinol has very good electrical and mechanical properties, long fatigue life, and high corrosion resistance. As an actuator, it is capable of around 6-7% strain recovery in the martensitic phase and around 14-15% in the austenitic phase, and high restoration stress with many cycles. It has a large difference in modulus of elasticity in the two phases, which enables the material to deliver a large amount of work while transforming phase.

Nitinol also forms a titanium oxide surface layer which shields the nickel from the outside, enabling biocompatible devices to be formed, such as medical stents or other implants.

A nitinol wire 0.5 mm in diameter can lift as much as 6 kg. Nitinol also has resistance properties, which enable it to be actuated electrically by joule heating. When an electric current is passed directly through the wire, it can generate enough heat to cause the phase transformation.

In most cases, the transition temperature of the SMA is chosen such that room temperature is well below the transformation point of the material. Only with the intentional addition of heat can the SMA exhibit actuation. In essence, Nitinol can be used as an actuator, sensor, and heater all in one material.

Shape memory alloys, however, are not suitable for all applications. The forces, displacements, temperature conditions, and cycle rates required of a particular actuator need to be taken into account. The advantages of Nitinol become more pronounced as the size of the application decreases. Large mechanisms may find solenoids, motors, and electromagnets more appropriate. However, in applications where such actuators can not be used, shape memory alloys provide an excellent alternative.

Nitinol alloys change from the martensite state to the austenite state when heated, and return when cooled.

Figure 1:
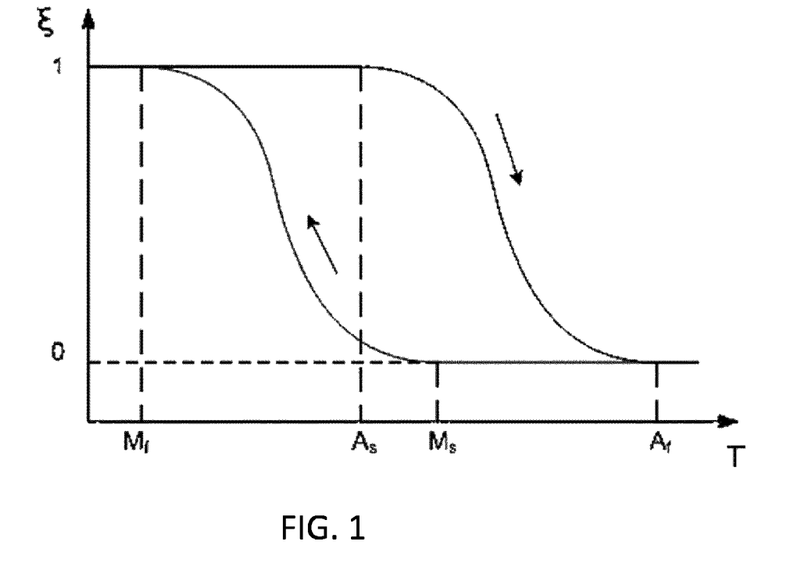
FIG. 1 shows the temperature-phase relationship for a shape memory material.

FIG. 1 shows the martensite fraction as a function of heating, during heating and cooling. During heating As and Af are the temperatures at which the transformation from martensite to austenite starts and finishes. The temperature As is the phase transition temperature. During cooling, Ms and Mf are the temperature at which the transition to martensite starts and completes.

The difference between the heating transition and the cooling transition gives rise to hysteresis where some of the mechanical energy is lost in the process. The shape of the curve depends on the material properties of the shape-memory alloy, such as the alloying and work hardening.

The transition from the martensite phase to the austenite phase is only dependent on temperature and stress, not time. When a shape-memory alloy is in its cold state (below As), the metal can be bent or stretched and will hold those shapes until heated above the transition temperature. Upon heating, the shape changes to its original shape. When the metal cools again it will change phase but not shape, and thus remain in the hot shape (that is the original shape), until deformed again.

With this one-way effect, cooling from the high temperatures does not cause a macroscopic shape change. A deformation is necessary to recreate the low temperature shape. The transition temperature As for Nitinol is determined by the alloy type and composition and can vary between −150° C. and 200° C. Generally, a transition temperature in the range −20° C. to 120° C. is used. Thus, the transition temperature can be tuned to a particular application.

There are also materials with a two way shape memory effect, based on cold work or hardening, with high stresses in the martensitic phase. However, the effect does not allow repeated temperature cycles, because stresses are released over time. This invention relates in particular to one way shape memory materials.

Figure 2:
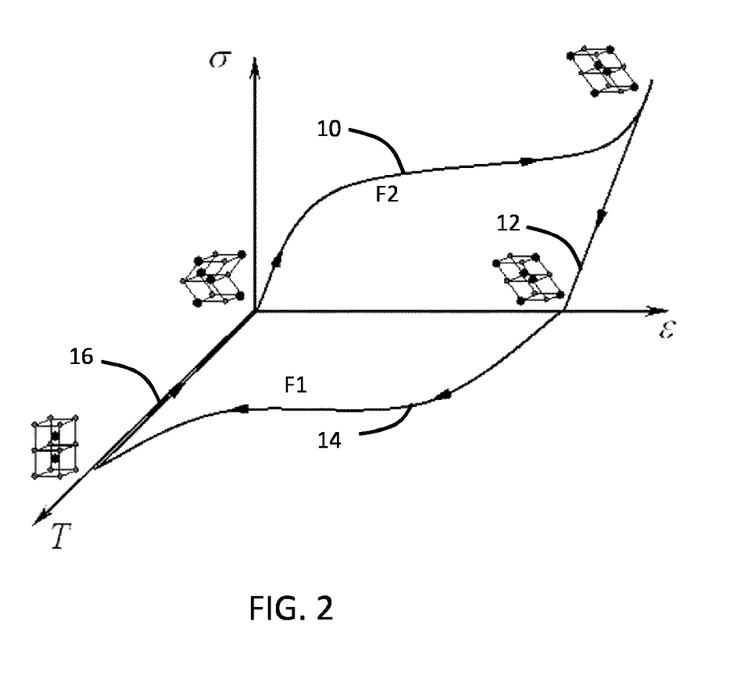
FIG. 2 shows the temperature-stress-strain relationship for a shape memory material.

As mentioned above, the phase transitions depend on stress as well as temperature. FIG. 2 is a schematic diagram showing a stress-strain-temperature function for the shape memory effect. The stress is shown as σ and the strain is shown as ε.

The material is annealed to remember a specific shape. The material is deformed into its low temperature shape along path 10 by applying a stress to the material. This is a detwinning region. There is a sharp increase in slope in the stress-strain curve after which the material becomes much more difficult to deform further. Once the stress is relieved shown as path 12, the large strain still stays in the material until heating above the transition temperature. This is the heating path 14 to bring the material to the austenite phase. It can then cool back into the twinned martensite phase along path 16 at which point the strain in the material has been relaxed (but the shape has not changed back).

The Modulus of Elasticity (E-modulus) of the high temperature phase of the SMM is significantly higher than the E-modulus of the low temperature phase.

The shape change that accompanies this phase change during heating is able to deliver a first force F1. After the temperature decrease below the phase change temperature, and thus after phase change to the low temperature phase, a lower force F2 is necessary to reshape the SMM into its original form (path 10 in FIG. 2).

The required reshaping force can be provided manually, for example using a spring or another SMM material.

The invention is based on the use of a layer structure having at least two layers of different coefficients of thermal expansion associated or coupled with the shape memory material. This essentially functions as a bimetallic strip configuration, and it makes the layer adopts the first shape at the lower temperature.

The actuator then comprises a shape memory material part and at least one additional layer. This additional layer can for example comprise or consist of a metal or metal alloy layer. The layer stack can be made of copper and steel.

By way of example, as shape memory alloys the following alloys can be chosen: Cu—Al—Ni, Ni—Ti. However, others can be used These include: Ag—Cd 44/49 at. % Cd, Au—Cd 46.5/50 at. % Cd, Cu—Al—Ni 14/14.5 wt. % Al and 3/4.5 wt. % Ni, Cu—Sn approx. 15 at. % Sn, Cu—Zn 38.5/41.5 wt. % Zn, Cu—Zn—X (X=Si, Al, Sn), Fe-Pt approx. 25 at. % Pt, Mn—Cu 5/35 at. % Cu, Zn—Cu—Au—Fe, Fe—Mn—Si, Pt alloys, Co—Ni—Al [21], Co—Ni—Ga, Ni—Fe—Ga, Ti—Pd in various concentrations, Ni—Ti—Nb, and Ni—Mn—Ga. As is known perse, the ratio of metals in the alloys can be used to tune properties such as the phase transition temperatures. Those skilled in the art will know how and where to modify the alloys to obtain phase change temperatures needed. NiTi (Nitinol) is preferred for most applications due its stability, practicability and superior thermo-mechanic performance.

Thus one copper layer, steel layer or nickel layer can be combined with a layer comprising or consisting of one or more of the shape memory materials. Choice of combination can be based on one part on increase of the differences of coefficients of thermal expansion and on the other part on improvement of adhesion of the layers to each other.

With only one additional layer, the shape memory material and the layer together implement the functionality of a bimetallic strip. However, two additional layers may be provided.

The forces between the different parts of the actuator are very different and thus large forces will exist over the interface between them. The components are thus connected together with strong connections, preferably over the total surface without air gaps, but such that the different parts retain their specific material properties. The connections can be comparable to the connections between two metals in a conventional bimetallic strip.

In the simplest case, there is a single layer such as a metal layer with a high CTE. The metal layer and the shape memory material layer perform as a bimetallic strip configuration.

In another example, the shape memory material layer is sandwiched between first and second layers of first and second coefficients of thermal expansion respectively. These can be metal layers, which together form a bimetallic strip configuration.

Figure 3:
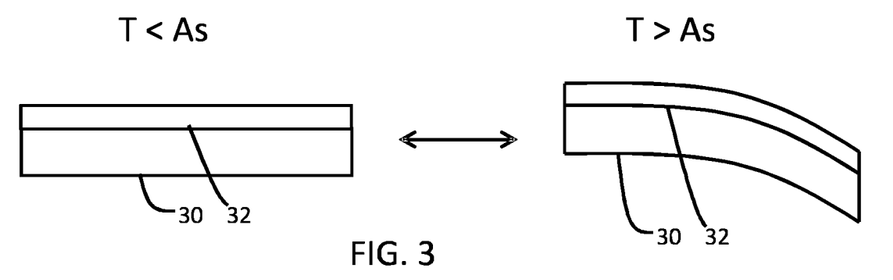
FIG. 3 shows a first example of an actuator in accordance with the invention

An example is shown in FIG. 3 of the simplest structures using a metal layer in combination with a shape memory material layer.

The first, martensite, shape is planar, and the second, austenite, shape includes a bend.

The high temperature shape of the SMM layer 30 thus includes a bend. A metal layer 32 of higher CTE than the SMM layer 30 is applied on the outside of the bend.

At high temperatures, the metal layer will try to expand, but will be hampered by the SMM before the phase change temperature is reached. However, the bending force resulting from the differential CTEs is in a direction to assist the bending of the SMM layer rather than opposing it.

As the SMM changes shape, due to its high force (high E-modulus giving force F1), the high CTE material follows this shape change.

Later on, when the temperature has decreased below the phase change temperature, the SMM has changed to the lower temperature phase, and due to its much lower E-modulus, the force to bring it back into the original shape (force F2) has decreased drastically.

Due to the lower temperature, the metal layer with high CTE contracts. Since the force necessary for changing the shape of the low temperature SMM phase is much lower, the metal layer 32 with high CTE delivers a suitable force to reshape the two-layer structure.

The metal layer has a high CTE so that it has a significant change in expansion between the two phases, sufficient to drive the actuator to the first shape.

Due to the super elastic properties of the SMM, multiple bending operations will not lead to fatigue. This however is different for bimetals. For this reason it is necessary to keep the thickness of the bimetals as thin as possible.

Figure 4:
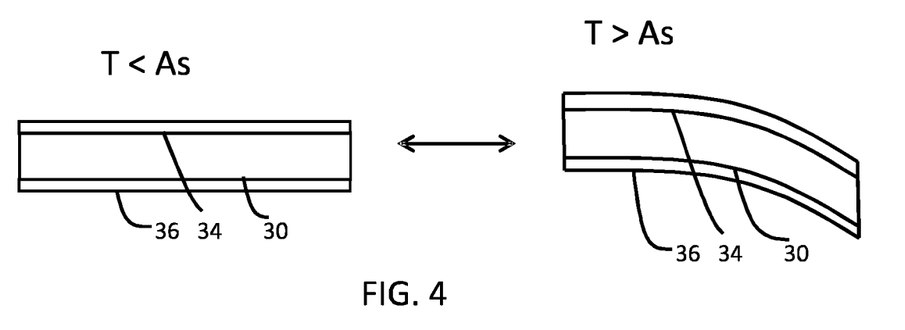
FIG. 4 shows a second example of an actuator in accordance with the invention.

For this reason, two bimetal layers are preferably used. These layers need to have a significant difference in CTE. The resulting structure is shown in FIG. 4.

Again, the first, martensite, shape is planar, and the second, austenite, shape includes a bend.

The metal layer 34 with the higher CTE is fixed at the outer bend of the SMM and the metal layer 36 with the lower CTE is fixed at the inner bend.

By way of example, the metal layers may comprise lead with a CTE of $28.9 \times 10^{-6}$ [K$^{-1}$] and zirconium with a CTE of $5.7 \times 10^{-6}$ [K$^{-1}$]. The metal layer may have a thickness in the range 0.2 to 1 mm, for example 0.5 mm, and the shape memory material layer can be thicker, for example 2 to 10 mm, for example 4 mm. The Nitinol shape memory material layer has CTE values between these two, for example $6.6 \times 10^{-6}$ [K$^{-1}$] in the martensite phase and $11 \times 10^{-6}$ [K$^{-1}$] in the austenite phase. These values will vary depending on the composition chosen.

The actuator can take the shape of a bar, for example 5 to 15 cm in length.

Below the phase change temperature, the layers adopt a straight shape. Above the phase change temperature, the bend is formed, due to the SMM 30. After cooling below the phase change temperature, the forces in the bimetal layers 34 and 36 are high enough to reform the set of layers to the straight shape.

The two bimetallic layers again assist the bending caused by the SMM layer rather than opposing it.

In both examples, the metal layers and the SMM are chosen so that at room temperature, the differential CTEs tend to bring the actuator to a flat configuration. This assists in enabling large movement strokes to be achieved.

The low temperature state may instead comprise the bent state, and the high temperature memory shape may then comprise a flat state, or indeed an even more bent state.

Figure 5:
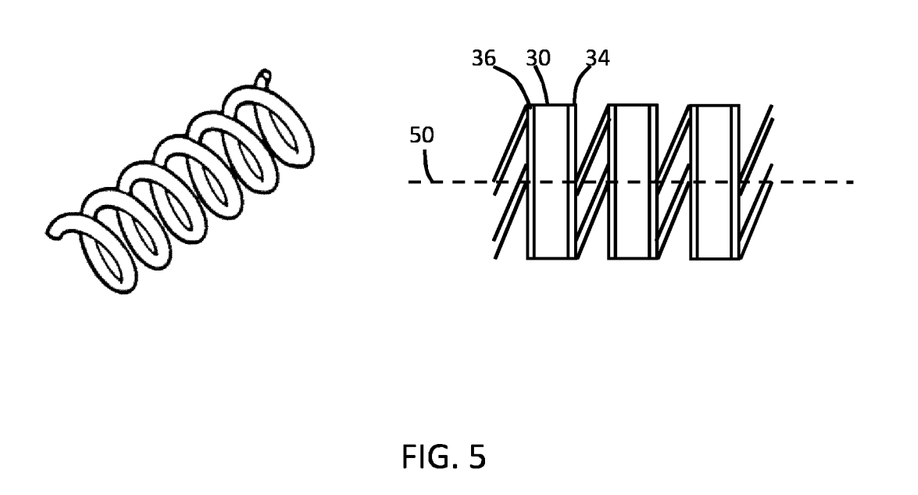
FIG. 5 shows a third example of an actuator in accordance with the invention.

Another example is shown in FIG. 5 in which the SMM and thus the connected metal layer or layers are shaped as a coil spring. The spring expands (or shrinks) with a temperature increase, and reforms back to the original after temperature decrease using the bimetallic strip design of the coil.

The three layer structure is shown. The coil spring has an elongate axis 50. The three layer structure explained above has layers 36,30,34 stacked along the axis direction so that differential expansion on opposite sides can give rise to spring expansion or contraction.

The same approach may be applied to other spring designs.

As mentioned above, the transition temperature can be chosen within a range by selection of the material properties, in known manner. The temperature will be selected depending on the desired temperature to be detected. There may be a critical temperature T1 which is to be detected. However, it is not essential that the actuator responds at this temperature. It may respond to a lower temperature T2, and the thermal properties of the medium between the component and the actuator can then be chosen to establish a suitable thermal gradient such that the actuator responds when the component has reached the desired switching temperature. This may be an air gap of suitable dimensions or another thermally insulating medium.

The invention can be applied generally to miniaturized actuators which respond to temperature. Some examples are discussed below.

A first set of examples provides a safety cut out circuit using the actuator, which operates an electrical cut-out switch when the shape memory material has the second shape.

This can be used to control a luminaire in dependence on the temperature of the lamp(s) inside. The temperature of the lamp heats the shape memory material (SMM) over the phase change temperature and thus the SMM changes form. The lamp(s) are then controlled to switch on and off, and the lamp operation is stable when in each of the two possible states. The advantage of the actuator of the invention compared with a bimetallic strip alone for instance is that the bimetallic strip is not able to deliver a significant force. A large bimetallic strip able to deliver a larger force becomes very heavy and fatigue becomes a serious issue.

On-off control may be considered to implement a binary safety cut-out. However, an analogue safety cut out is also possible, which varies an output signal in dependence on the actuator position. Thus, different actuator positions can give rise to different control instructions.

For example, the SMM can be positioned so that it deflects away from the source of heat during use. When the lamp is on, the SMM heats up and due to the phase change it bends away from the lamp. Due to this movement, the distance from the lamp becomes large enough to cool down below the phase change temperature again and it thus bends back. Since the lamp is still producing the same amount of heat, the SMM is heated up again and bends away again, and so on.

So during lighting the actuator oscillates. This can be used to provide a physical change in shape of the lamp, to create a design effect which has termed a "living luminaire". For this purpose, different parts of the luminaire body may be movable relative to other parts, or light source positions may be movable with respect to optical components which process the light output. This relative physical movement can be controlled by the actuator, which is able to deliver a sufficient force to control the movement of components.

There may be a single actuator associated with a light source, for example creating a wave-like lighting effect. However, multiple actuators may be provided in one luminaire in combination with each other, for example pulling and pushing luminaire components. This can create more dynamic effects for example similar to the movement of a sea anemone.

A second set of examples makes use of a set of the actuators for cycling the operation of a plurality of devices. This can also be used in a lighting unit comprising a plurality of lighting elements.

For example, lamp A is switched on and heats up an actuator. The actuator moves and controls a switch that turns on another lamp B (or multiple other lamps). Lamp B has another actuator that heats up when lamp B is on. This actuator also controls a switch, that might turn on other lamps, but that might also turn off lamp A. The actuator close to lamp A then cools down and returns to the original position. Later in the cycle, the lamp A is again switched on and the routine can start again.

This approach can be used to avoid overheating of the individual lamps by cycling their operation. There may be one or more lamps on at any particular time. Alternatively, this approach can provide a simple mechanism for providing lighting effects, such as a set of twinkling lamps without the need for complex control circuitry.

There are also possible applications in self-cleaning outdoor luminaires. LEDs have a lifetime of up to 30 years, so the interest of having automatic cleaning of the outdoor luminaire surface (e.g. hanging high above a road) is increasing. This can for example be achieved by the use of self-cleaning surfaces that reject dirt/algae etc., but this technology is not yet commercially available. A cleaning process can instead be initiated in response to the temperature of the lamp. This sensing may for example be triggered in combination with a sensor that detects rain, so that the wiping action runs only if water (and soap) is present.

The detection of rain can be based on water collection on top of the luminaire, so that at the moment the wiping action starts there is also enough rain water present.

Another example is for the automatic maintenance of motors that consume oil. A motor circuit then includes an oil-lubricated motor, an oil reservoir and a valve for supplying oil to the motor from the reservoir. The actuator can be used for controlling the supply of oil to the motor in dependence on the motor temperature.

There are mechanisms to add oil while motors are running, to avoid problems such as stalling. The addition of oil can thus be made in response to rising temperature at which the actuator opens an oil inlet valve. When enough oil is added the temperature decreases and the actuator closes the valve again. In this way the actuator is the detector (detects when the temperature becomes too high), and it is also the actuator for solving the problem (when detecting the temperature is too high it opens the oil inlet valve). The actuator is also the safety detector (it detects that the temperature is low enough again) and the same actuator is used to close the oil inlet valve when enough oil is added. This enables all functions with one device that operates without the need for electricity.

Another example is that actuator may also be used to operate emergency brakes on cars, trains, roller coasters, etc. in response to the temperature of a safety critical component. This can be implemented without the need for extra components.

Figure 6:
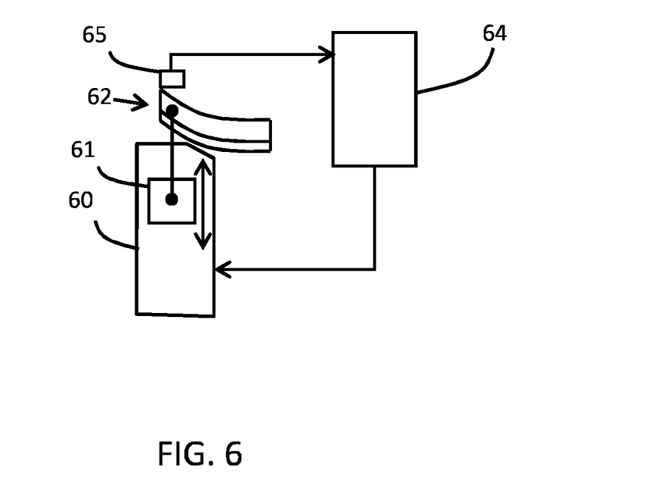
FIGS. 6 and 7 each show an apparatus using an actuator in accordance with the invention.

FIG. 6 shows in schematic form a system using the actuator.

The system comprises a component 60 which requires protection or other action to be taken when it (or a part of it) exceeds a critical temperature. Alternatively, the action in response to temperature may be for aesthetic or other control reasons.

In this example, a part 61 of the component is mechanically movable, under the control of the actuator 62.

The component 60 may the oil-lubricated motor or the luminaire in the examples above. However, it may be any component based on temperature control. The part 61 of the component may be an oil control valve for the oil-lubricated motor example above, or it may be an optical beam processing component, or a light source, or a housing component for the luminaire example above. For example, an optical output effect can be changed by adjusting the relative position between a light source a beam processing component.

The actuator may also comprise a heating element so that it is controlled to heat up rather than responding to an independent temperature of a component being sensed.

The movement used in the arrangement of FIG. 1 can be entirely mechanical, and the actuator can deliver sufficient force to control the movement accordingly. The ability of the shape change material to deliver a significant force makes the actuator of particular interest when mechanical operations are to be carried out based on the physical shape of the actuator. The use of a bimetallic device alone for such control may therefore not be possible.

However, the actuator can alternatively or additionally provide electrical control.

For example, the actuator 62 can be used to control electrical switches within an electrical circuit. For example a controller 64 may optionally be used to take appropriate action based on a setting of one of more switches 65. In the luminaire examples above, this may be by turning off a lamp, or lowering the power consumption by turning down the lamp output.

In all examples, the actuator 62 returns to its lower temperature setting at a later time, because the action taken results in a change in temperature present at the actuator. For example, the actuator may be further from the source of heat, or the component 60 may be generating less heat (because it has been turned off or set to a lower output power, or other corrective action has been taken to prevent overheating).

As mentioned above, a system may comprise many components 60 and associated actuators 62, to implement an automated cycling of operation of the multiple components.

FIG. 6 shows a closed loop system, wherein a temperature of the component is sensed and used to control the component. However, as explained above, the system may be an open loop system which is simply driven (e.g. by passing a current through a Nitinol layer) to heat up and provide the control of the device, independently of the temperature of the component being controlled. Thus, the use of the temperature sensing function is optional, and the actuator can function as only a control device.

Figure 7:
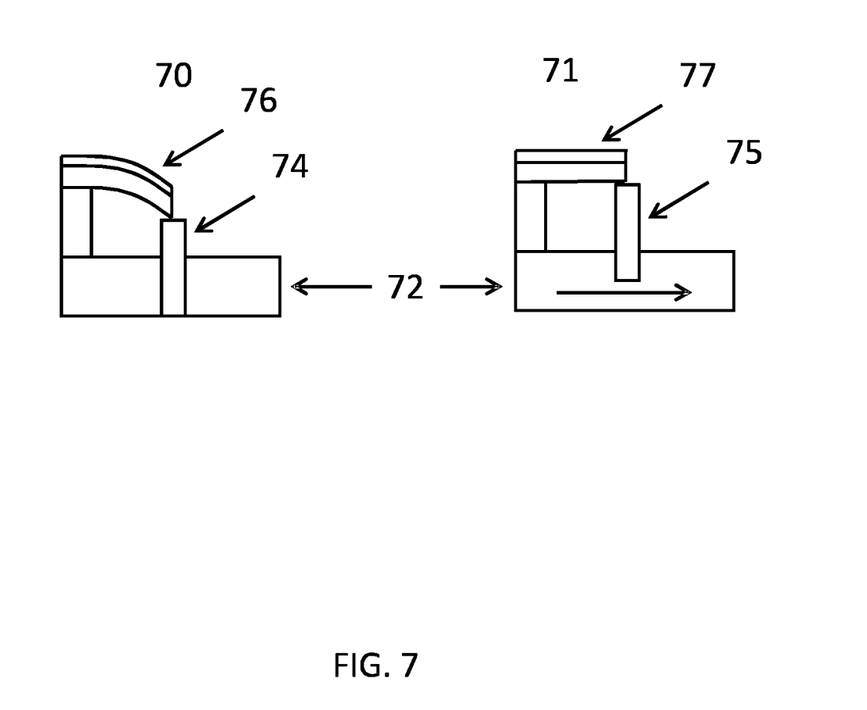

FIG. 7 shows a valve 70 including the actuator device 76 of the invention in closed configuration and shows the same valve as 71 with the actuator device 77 in the closed configuration. The plunger 74 blocks flow in the pipe 72 in the configuration 70 while it allows flow when the plunger 75 is not blocking the pipe 72 in the configuration 71.

In the examples above, metals are used to form a bimetallic strip arrangement and a metal or metal alloy (such as Nitinol) shape memory layer is used.

Organic and plastic shape memory materials are also available. Generally, the force they can deliver is lower, but there may be applications requiring a lower force where such materials can be used. Of course, there may be organic shape memory materials in future which can deliver larger forces.

The layer structure having at least two layers of different coefficients of thermal expansion may typically be implemented using metal layers. However, the functionality is based only on the difference in CTE, and non-metal layers may also be used to provide suitable relative CTE values. Furthermore, Electro Active Polymers ("EAPs") exist which extend when electrically activated. If an EAP is attached to a bendable but not stretchable material the configurations bends, like a bimetallic configuration, when stimulated and stretches again when the electricity is removed. By making the control of the EAP dependent on temperature, effectively a CTE of the EAP is implemented, which is different to the CTE of the non-stretchable material (which has CTE close to zero). Thus, the layer structure may in this case be an actively controlled device rather than a passive device which simply responds to temperature. A temperature dependent control circuit is then used to control the driving of the EAP.

The activation of the EAP can only last a duration sufficient to return the shape memory material to its shape as desired at low temperatures.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

In summary a heat sensitive actuator uses a shape memory material layer which is thermally stimulated to change shape, in response to a rise in temperature, from a first shape at a first temperature to a second shape at a second temperature. A layer stack is associated with the shape memory material layer, and it can adopts the first shape at the first temperature. In this way, the layer stack is used to return the shape memory material to its original shape after cooling.

The invention claimed is:

1. An actuator device having an actuator member, the actuator member being configured to define at least a first actuation state of the actuator device and a second state of the actuation device, the second state being different from the first state, the actuator member comprising:
    a layer stack comprising a first layer and a second layer attached to each other for operating like a bimetallic strip upon heating and cooling of the actuator device, the first and second layers having different coefficients of thermal expansion and not being pre-stressed, and
    a shape memory material layer that is not pre-stressed, and is directly attached to an external surface of the layer stack, the shape memory material layer comprising or consisting of one or more one-way shape memory materials, the shape memory material layer being configured to change shape from a first shape at a first temperature to a second shape at a second temperature higher than the first temperature, the first shape being associated with the first actuation state and the second shape being associated with the second actuation state,
    wherein the first temperature is associated with a martensite state of the shape memory material layer and the second temperature is associated with an austenite state of the shape memory material layer, and
    wherein the layer stack is configured, through thermal contraction of the first and second layers of the layer stack, to return the shape memory material layer from the second shape to the first shape upon a temperature change of the actuator device from the second temperature to the first temperature.

2. The actuator device as claimed in claim 1, wherein the first temperature is below the phase change temperature of at least one of the at least one shape memory materials and the second temperature is above the phase change temperature of the at least one of the at least one shape memory materials.

3. The actuator device as claimed in claim 1, wherein the shape memory material layer has a coefficient of thermal expansion that is between the coefficients of thermal expansion of the first layer and the second layer.

4. The actuator device as claimed in claim 3, wherein the shape memory material layer is directly attached to only the second layer and not directly attached to the first layer.

5. The actuator device as claimed in claim 3, wherein the first shape and/or the second shape are bent shapes in a stack direction of the layer stack and either
    the first shape is a less bent shape than the second shape, the first layer is at an outer side of the second shape and the first layer has a higher coefficient of thermal expansion than the second layer, or
    the first shape is a more bent shape than the second shape, the first layer is at an inner side of the shape memory material layer and the first layer has a higher coefficient of thermal expansion than the second layer.

6. The actuator device as claimed in claim 1, further comprising a heater device for heating at least the shape memory material layer and/or a cooling device for cooling at least the shape memory material layer.

7. The actuator device as claimed in claim 1, wherein the first shape and the second shape each comprise coiled spring shapes with different degrees of spring expansion, wherein the coiled spring has a central axis and wherein the layers are stacked along the central axis direction.

8. An apparatus comprising the actuator device as claimed in claim 1, wherein at least part of the apparatus is controlled by the actuator device.

9. The apparatus as claimed in claim 8, wherein the apparatus comprises a circuit including the actuator device, wherein the actuator device operates as a switch.

10. The apparatus as claimed in claim 8, wherein the apparatus is a lighting device.

11. The apparatus as claimed in claim 8, wherein the apparatus is a part of, or is a motor, wherein the actuator device is part of a valve for control of fluid used with the motor when in operation.

12. An actuation method, comprising acts of:
    providing a shape memory material layer without pre-stressing and comprising or consisting of at least one one-way shape memory material;
    providing a layer stack having an external surface directly attached to the shape memory material layer, the layer stack comprising a first layer and a second layer attached to each other for operating like a bimetallic strip upon heating and cooling, the first and second layers having different coefficients of thermal expansion and not being pre-stressed;
    heating the actuator device to thereby change the temperature of at least the shape memory material layer from a first temperature to a second temperature higher than the first temperature to thereby change the shape of the shape memory material layer from a first shape to a second shape, the first shape being associated with a first actuation state of the actuation device and the second shape being associated with a second actuation state of the actuation device, wherein the first temperature is associated with a martensite state of the shape memory material layer and the second temperature is associated with an austenite state of the shape memory material layer;
    cooling the actuator device, to thereby change the temperature of at least the layer stack from the second temperature to the first temperature to cause the layer stack to return the shape memory material layer from the second shape to the first shape, through thermal contraction of the first and second layers of the layer stack.

13. The method as claimed in claim 12, comprising an act of configuring the first actuation state and the second actuation state to control flow of electricity, liquid or gas based on temperature or heat change.

14. The method as claimed in claim 12, wherein providing the shape memory material layer and the layer stack comprises acts of providing the shape memory material layer with a coefficient of thermal expansion that is between the coefficients of thermal expansion of the first layer and the second layer.

15. The method as claimed in claim 12, wherein providing the shape memory material layer and the layer stack comprises acts of: providing the first shape and the second shape each as coiled spring shapes with different degrees of spring expansion, the coiled spring having a central axis; and stacking the layers along the central axis direction.

16. An actuator device having an actuator member, the actuator member being configured to define at least a first actuation state of the actuator device and a second state of the actuation device, the second state being different from the first state, the actuator member comprising:
- a layer stack comprising a first layer and a second layer attached to each other for operating like a bimetallic strip upon heating and cooling of the actuator device, the first and second layers having different coefficients of thermal expansion, the first layer not being pre-stressed, and
- a shape memory material layer comprising the second layer or a separate layer, and comprising or consisting of one or more shape memory materials, the shape memory material layer being configured to change shape from a first shape at a first temperature to a second shape at a second temperature higher than the first temperature, the first shape being associated with the first actuation state and the second shape being associated with the second actuation state,
  - wherein the layer stack is configured, through thermal contraction of the layers of the layer stack, to return the shape memory material layer from the second shape to the first shape upon a temperature change of the actuator device from the second temperature to the first temperature, and
  - wherein the first shape and the second shape each comprise coiled spring shapes with different degrees of spring expansion, wherein the coiled spring has a central axis and wherein the layers are stacked along the central axis direction.

* * * * *